United States Patent [19]

Edmonds

[11] Patent Number: 4,790,559

[45] Date of Patent: Dec. 13, 1988

[54] UTILITY CARRIER

[76] Inventor: Joseph Edmonds, 17817 Crenshaw, #1, Torrance, Calif. 90504

[21] Appl. No.: 140,638

[22] Filed: Jan. 4, 1988

[51] Int. Cl.⁴ ............................................. B62B 1/20
[52] U.S. Cl. ................................... 280/655; 280/659; 280/47.37 R
[58] Field of Search .................. 280/35, 42, 639, 651, 280/652, 655, 47.18, 47.2, 47.26, 47.34, 47.37 R, 47.35, 659

[56] References Cited

U.S. PATENT DOCUMENTS

| | | | |
|---|---|---|---|
| 2,212,053 | 8/1940 | Smith | 280/651 |
| 2,419,422 | 4/1947 | Schulein | 280/651 |
| 4,493,492 | 1/1985 | Balabanova | 280/47.37 R X |
| 4,523,774 | 6/1985 | Dickerson | 280/655 |
| 4,618,157 | 10/1986 | Resnick | 280/655 X |
| 4,619,464 | 10/1986 | Hwang | 280/655 |

Primary Examiner—John J. Love
Assistant Examiner—Michael Mar
Attorney, Agent, or Firm—Roger A. Marrs

[57] ABSTRACT

A collapsible carrier for transporting implements, goods or personnel over paved or sand surfaces which includes a horizontal frame mounted on wheels and having a rail extending about the frame to retain the load being carried on the frame. A handle is pivotally attached to one end of the frame while a slider device is carried on the underside of the frame at its opposite end. The rails and handle are arranged to fold into a storage position and to extend into an operative position. The utility carrier and its load is supported on the wheels or the slider device when in its operative position.

6 Claims, 1 Drawing Sheet

U.S. Patent  Dec. 13, 1988  4,790,559

UTILITY CARRIER

BACKGROUND OF THE INVENTION

1. Field of the Invention

The present invention relates to tote carriers and, more particularly, to a novel carrier adapted to transport goods or personnel over paved or sand surfaces by means of either wheels or runners downwardly depending from a load supporting frame intended to support the goods or personnel.

2. Brief Description of the Prior Art

In the past, goods or personnel have been transported over paved surfaces by wheeled vehicles such as carts or wagons. However, when these vehicles are intended to be used in connection with sand such as at the beach, the wheeled assemblies are detrimental and ineffective to movably supporting the vehicle. In this connection, runners such as used on sleds or the like will movably support the vehicle.

More specifically, wagons or carts having wheel assemblies are not useful at the beach in connection with carrying or movably supporting beach accessories or small children through the sand. The body of the cart or wagon is useful in supporting small children, tots or babies and by combining runners and wheel assemblies together, the container can be movably supported on paved surfaces or sand beaches as well.

Furthermore, conventional carts and wagons do not deploy between a folded position for storage and an operative position for carrying a variety of loads. Conventional wagons employ rigid sidewalls or rails which will not fold or collapse into a reduced area for storage purposes.

Therefore, a long standing need has existed to provide a novel utility carrier which includes a base or frame for supporting beach accessories or the like, as well as small children, that includes means for movably supporting the carrier on sand, loose dirt or the like. Means are needed for not only holding or retaining the load on the base or frame but are needed for folding the entire construction into a storage configuration.

SUMMARY OF THE INVENTION

Accordingly, the above problems and difficulties are obviated by the present invention which provides for a collapsible carrier, foldable between an open position for carrying or toting loads and a folded storage position. The carrier includes a frame providing a base for supporting a wheeled means permitting travel over a paved surface or roadway and for supporting a slider or ski means at the front end of the frame for use in sliding the carrier over a sandy or gravel surface. An upright rail pivotally carried on the opposite sides of the frame is provided which can extend from the storage position into the operative load-carrying position by means of telescoping rail sections so that the load may be retained on the base frame during transport. A handle is pivotally carried on the end of the base frame opposite to its end carried the slider or ski means, and the handle is adapted for closure between the rails when the carrier is in its folded storage position.

Additionally, strap means may be provided for releasably securing a load to the base frame and a webbed support may be extended across the base frame for supporting the weight of a load during transport.

Therefore, it is among the primary objects of the present invention to provide a novel carrier for transporting a variety of beach accessories and supplies over a paved or sand surface in a convenient and economical manner.

Another object of the present invention is to provide a novel carrier for beach supplies which not only includes a wheelable or rollable support for the carrier so that transport over paved surfaces is smooth, but includes a slider device or means for supporting the carrier on sand or gravel surfaces.

Still a further object of the present invention is to provide a novel wheeled and runner carrier which may support a load on a paved or sand surface and which includes foldable side rails and handle means so that the carrier may be deployed in either a folded storage position or expanded into an operative unfolded position.

Yet another object of the present invention is to provide a novel carrier for pulling, hauling or pushing beach supplies over paved and sand surfaces, which includes rollable means for the paved surface and a slider means for the sand or gravel surface, and which further is adapted for deployment between a folded position for storage purposes and an unfolded position for load carrying.

Yet another object of the present invention is to provide a novel utility carrier having means for supporting heavy loads on a sandy surface or paved surfaces, and which includes means which are cooperatively disposed with respect to one another for movably supporting the loads and the carrier on either of the surfaces.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
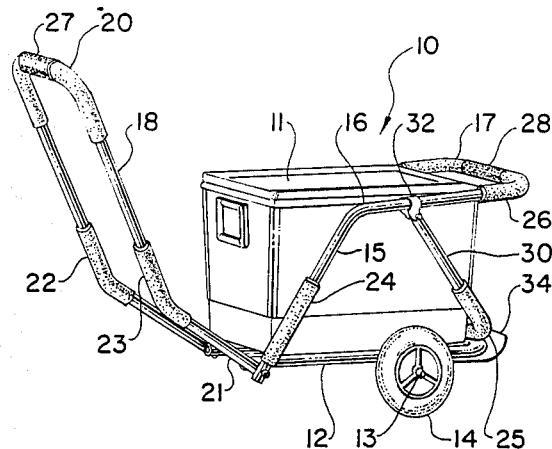
FIG. 1 is a perspective view showing the novel utility carrier of the present invention supporting a load.

Referring to FIG. 1, the novel utility carrier of the present invention is illustrated in the general direction of arrow 10 which is shown in its unfolded or extended position for supporting or carrying a load which is indicated by numeral 11. In the present illustration, the load takes the form of a utility box 11; however, it is to be understood that a variety of loads may be employed, such as scuba diving tanks, utility bags or the like. The utility carrier 10 includes a base frame 12 supporting an axle 13 mounting wheels on each end, such as wheel 14. Therefore, it can be seen that the utility carrier 10 is wheelably supported for transporting the load over a paved or relatively smooth and hard surface.

Figure 2:
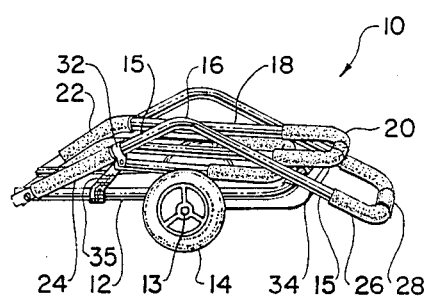
FIG. 2 illustrates the novel utility carrier shown in FIG. 1 in its folded condition for storage purposes.

The utility carrier further includes a rail system comprising side rails 15 which are attached at one end to the rear end of frame 12 and extend upwardly to a bend 16 where the side rail extends forwardly to terminate in a cross member 17 that crosses over the front end of the frame in fixed spaced apart relationship where the rail then extends rearwardly and downwardly identically to the side rail 15 for termination in connection with the rear end of the frame 12 opposite to the end connected by the end of side rail 15. The connections of the opposite ends of the side rails to the opposite sides of the frame are pivotal so that when the side rail is collapsed, as shown in FIG. 2, the side rail will pivot, permitting the carrier to be positioned into a storage condition. Also, a handle 18 is illustrated which is closed at one end as represented by numeral 20, while its opposite end, indicated by numeral 21, is pivotally connected to the juncture of the side rails with the frame. Such a construction then permits the handle 18 to be folded over the side rails, as shown in FIG. 2, so that the carrier assumes its folded or storage condition.

In order to protect the handle and railing from damage, as well as certain portions of the base frame 12, cushion material is carried on the respective carrier components. For example, numerals 22 and 23 represent cushion sleeves that are placed about the elbow of the handle 18. Sleeve cushion 24 is carried on rail 15, and it is to be understood that a similar cushion sleeve is carried on the opposite side of the carrier. Cushion material 25 is carried on the front end of the base frame to serve as a bumper while additional cushion material 26 is carried about the cross member or piece of the rail 15.

In order to increase the user's grip while pulling, pushing or otherwise maneuvering the carrier over a paved or sandy surface, a grip material 27 is carried about the handle 20 while grip material 28 is carried about the cross piece and cushion material 26 at the front end of the rail 15.

Figure 3:
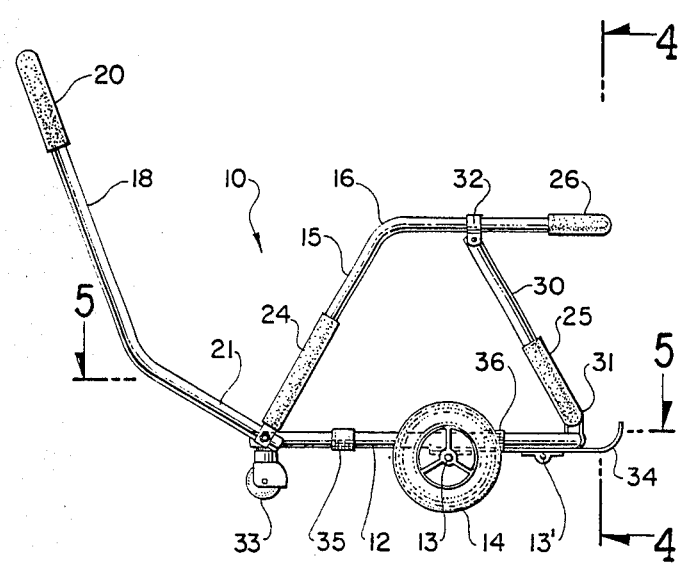
FIG. 3 is a side elevational view of the utility carrier in its unfolded or extended position preparatory for introduction of a load onto the base frame between the support rails.
Figure 4:
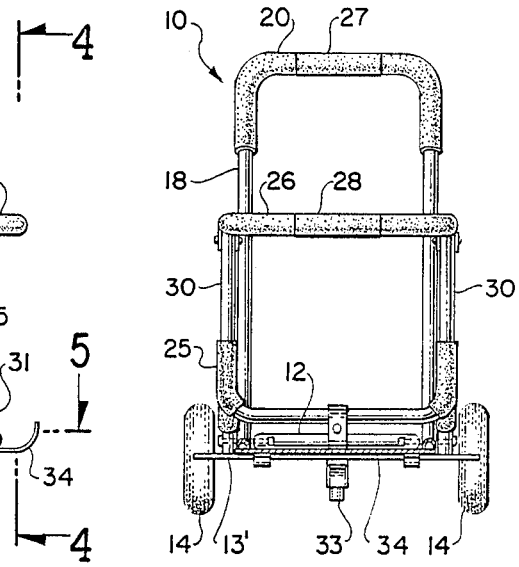
FIG. 4 is a front end view of the utility carrier as taken in the direction of arrows 4—4 of FIG. 3.

Referring now in detail to FIGS. 3 and 4, it can seen that the rail 15 is in the shape of an inverted "L" and that the forward or horizontal portion of the side rail 15 which terminates in the cushion material 26 is supported by a brace 30. The brace 30 is pivotally connected to the front end of the base frame 12 at pivot 31, while the upper or opposite end of the brace 30 is pivotally coupled to a sliding ring 32 adapted to slide over the horizontal section of the side rail 15. Therefore, when the side rail 15 is pivoted forwardly into the folded position shown in FIG. 2, the brace will slide via its ring 32 over the horizontal section of the side rail to accommodate the folding position.

FIG. 2 also shows that the rear end of the base frame 12 is supported by caster wheels, such as wheel 33, while the extreme forward end of the base frame 12 supports a slider device 34 which is useful in supporting the carrier and its load on sandy or gravel surfaces.

Figure 5:
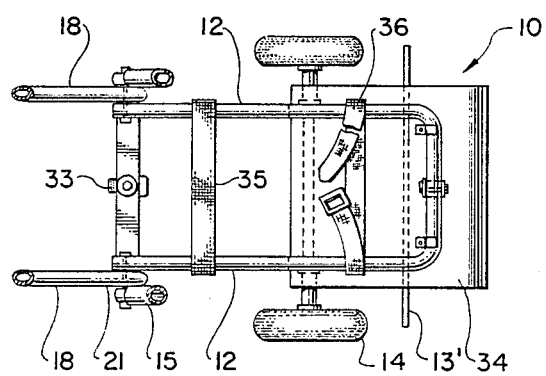
FIG. 5 is a longitudinal cross-sectional view of the utility carrier shown in FIG. 3 as taken in the direction of arrows 5—5 thereof.

FIGS. 3 and 4 illustrate that the slider device 34 is a detachable element that may be included or excluded at the desire of the user. The slider device is easily clamped or fastened onto the underside of the frame 12 as required. Also, it is to be understood that the casters 33 are optional and need not be used. Also, FIG. 4 illustrates that a single caster wheel may be employed Referring now in detail to FIG. 5, it is to be understood that the load 11 may be supported on the base frame 12 with the cooperation of a webbed strap 35 that is fixedly secured about the opposite sides of the frame 12. Additionally, a webbed strap 36 may be employed, having a closure means so that its opposite ends may be detachably connected together about a load for securement purposes. By provisions of the detachable strap 36, the load may be secured directly to the base frame 12 and be substantially integrally associated therewith. Another feature of the invention resides in the fact that the wheels 14 may be removed and the axle may be used for supporting the slider element 34 when it is desired not to use the wheels. The axle in use for supporting the slider is indicated by numeral 13' in FIGS. 3 and 5.

Therefore, it can be seen that the utility carrier 10 of the present invention may be folded into a storage position, as shown in FIG. 2, or unfolded into an operative position, as shown in the remaining figures. The load 11 may be placed on the base frame 12 between the side rails of which side rail 15 is one. The braces 30 on opposite sides of the base frame further augment or cooperate with the side rails for retaining the load on the frame. The wheels 14 may be used without the slider device 34 and the slider device 34 may be used with the wheels or they can both be used together at the selection of the user. Also, the caster 33 may be placed in operative position at the selection of the user. The handle 18 may be outwardly pivoted into an operative position, as shown in FIGS. 1 and 3, or may be pivoted about its pivot with the rear end of the base frame 12 into the folded position, as shown in FIG. 2 wherein the side elements of the handle reside on the outside of side rail 15. When in its operative position, the carrier straps 36 may be detachably connected about the load as the load is supported on the flexible web 35. Since a certain amount of flexibility or resiliency is embodied in the webbing of the belt 35, the webbing somewhat assumes the contour of a weighted load which is placed thereon. Such conformity further aids in the support of the load on the frame 12.

It is to be noted that the wheels may be carried on the axle midway between the opposite ends of the base frame or the wheels may be carried on the axle adjacent to the front end. The axle is interchangeable between the two mounting positions. Furthermore, a bungee cord may be used by having its opposite ends attached to the side braces and its expandable midsection deployed about the load, equipment or supplies being carried. In such an event, the side rail need not be used since the braces and cord will retain the load in position on the frame.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A portable utility carrier for transporting various articles and loads across paved or sand surfaces, said carrier adapted to be collapsed into a storage position or extended into an operative position, said carrier comprising the combination of:

a rectangular base frame having a front end and a rear end connected together by said elements:

a U-shaped rail in plan view having parallel side sections pivotally secured at one end to said frame rear end and having their other ends terminating with a cross bar extending over said frame front end in a raised cantilevered relationship while in said operative position, said U-shaped rail lying substantially adjacent said base frame while in said storage position;

brace means pivotally attached at one end to said frame front end and terminating in a slidable supporting connection means at an opposite end with each of said side sections, said brace means supporting said cross bar in a raised operative position over said frame front end, and said brace means lying substantially adjacent said base frame while in said storage position;

U-shaped handle means pivotally carried on said frame rear end and positionable between an outwardly extending operative position and a storage position with said handle lying substantially adjacent to said base frame;

wheels removably disposed on said frame midway between its front and rear ends for rollably supporting said frame on a paved surface; and a slider plate removably disposed on said frame front end for slidably supporting said frame on a sand surface.

2. The invention as defined in claim 1 including:
strap means disposed on said frame for detachably securing said articles and loads to said frame.

3. The invention as defined in claim 2 including:
said frame, said U-shaped rail and said handle means having a first unfolded position defined as an operative position and a second folded position defined as a folded storage position.

4. The invention as defined in claim 3 wherein said connection means comprises:
a collar pivotally attached to said brace means and slidably carried on said rail operable to support said rail in its upright position in said operative position and for lowering said rail in its storage position.

5. The invention as defined in claim 4 wherein:
a common axle is provided slidably carried on said frame for supporting said wheels or said slider.

6. The invention as defined in claim 5 including:
a single caster wheel detachably carried on said rear end of said frame.

* * * * *